Nov. 22, 1938.    J. A. BOYER    2,137,329
ABRASIVE ARTICLE AND ITS MANUFACTURE
Filed July 6, 1937

INVENTOR.
JOHN A. BOYER.
BY
ATTORNEY.

Patented Nov. 22, 1938

2,137,329

UNITED STATES PATENT OFFICE 2,137,329

ABRASIVE ARTICLE AND ITS MANUFACTURE

John A. Boyer, Niagara Falls, N. Y., assignor to The Carborundum Company, Niagara Falls, N. Y., a corporation of Delaware Application July 6, 1937, Serial No. 152,040 In Great Britain May 11, 1937

3 Claims. (Cl. 51—280)

This invention relates to metal bonded abrasive articles and their manufacture. The present application is a continuation in part of my copending application Serial No. 93,038, filed July 28, 1936. In this copending application a method was disclosed for bonding an abrasive in which two metallic ingredients of the original mix were sintered into a homogeneous solid solution.

One of the objects of the present invention is to produce a metal bonded abrasive of high cutting efficiency. Another object is to provide a cutting or lapping medium for glass, tungsten carbide and other extremely hard materials such as quartz, silicon carbide and other hard carbides, in which the abrasive can be retained in the metal matrix without the chipping out of the bond during grinding.

In the production of metal bonded abrasives for the cutting of extremely hard materials, it has been customary to employ bonds which are characterized either by extreme hardness or by brittleness. When the bond is extremely hard, it is difficult to dress the wheel so as to present a fresh cutting surface; whereas if the bond is brittle, the wheel may be self-dressing, but the abrasive is lost continually during the grinding operation. In the case of a diamond abrasive, the cost of the diamonds constitutes the principal cost of the article, and it is desirable to retain the diamonds for as long a period as possible during the grinding operation. When a wheel is self-dressing in cutting such materials as tungsten carbide, the diamond loss may be so great that the wheel is not commercially practicable.

I have found that a diamond abrasive containing a fairly hard ductile bond, preferably one of the solid solution type such as is described in my previously mentioned copending application, will satisfactorily cut many extremely hard materials, even though the bond is free from brittle characteristics. When such a wheel is used to cut brittle materials such as glass, silicon carbide, fused alumina, refractories, porcelain and fireclay, the detritus formed is sufficient to make the wheel self-dressing, even though the bond is ductile. I have found that under these conditions there is very little wearing away of the metal matrix in spite of the fact that one would expect the ductile bond to wear away quite rapidly. In the cutting of metallic materials such as cemented tungsten carbide tools, the wheel may not be self-dressing, as is the case with a brittle bond, but when the cutting rate drops off appreciably, it can be restored by a simple dressing operation, which can be accomplished in a few seconds by rotating the wheel while wet against an abrasive material such as bonded fused alumina or bonded silicon carbide. As the wheels will cut these dressing materials with very little wheel loss, the dressing loss is comparatively low, and the entire grinding operation is more efficient than one in which the bond is brittle so that it chips out during grinding.

In order to produce a metal bond which is moderately hard and which at the same time is sufficiently ductile to permit a rapid dressing of the wheel, it is desirable to use alloys of the solid solution type, in which the base metal is hardened but in which ductility can be retained. Specific examples of such copper base alloys are those containing up to about 15% tin, 10% cobalt and 39% zinc respectively. These alloys are homogeneous, ductile, solid solutions under equilibrium conditions. These solid solutions can be formed either by sintering the individual powdered component metals or by comminuting a previously formed solid solution alloy.

Several types of abrasive wheel to which the method of bonding with a ductile solid solution alloy is applicable are illustrated in the accompanying drawing.

Figure 1:
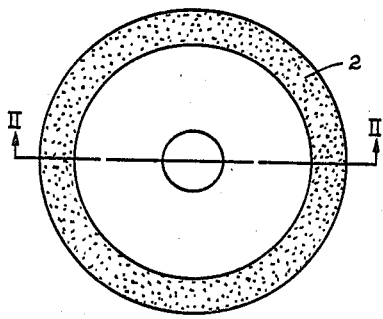
Figure 1 shows a plan view of a wheel adapted for the facing of tungsten carbide tools.
Figure 2:
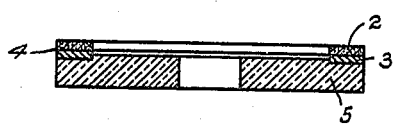
Figure 2 shows a section of the wheel shown in Figure 1, the section being taken along the line II—II.

The wheel shown in Figures 1 and 2 consists of an abrasive layer 2 and a metal backing layer 3. The two layers can be sintered simultaneously from metal powders into a coherent mass. This mass forms an abrasive ring 4 which can be mounted on a backing 5 made of resin or other suitable material.

In the abrasive ring shown in Figure 1 the abrasive used should be an extremely hard material such as diamond or boron carbide if the wheel is to be used for the facing of tungsten carbide tools. When such an expensive abrasive is used, it is desirable to produce a composite ring in which only a relatively thin surface layer 2 contains the expensive abrasive material. The backing 3 of the ring can be sintered from powdered metal, and in making such a backing it is desirable to add a cheap abrasive in approximately the proportions of the abrasive added in the surface layer 2, so that the shrinkage during sintering will be approximately the same for both layers. This is particularly important if the ring is cold molded and sintered without the application of pressure, because under such conditions two composite layers of different composition may have radically different shrinkage values and the ring upon sintering will have a tendency to warp. Some adjustment of the abrasive compositions in the two layers may be necessary so as to secure exactly the same shrinkage in the two cases. It is of course impossible to give exact proportions for each different abrasive and different alloy or combination of alloys, but in general, the volume percentage of abrasive in the two layers should be approximately equal.

Figure 3:
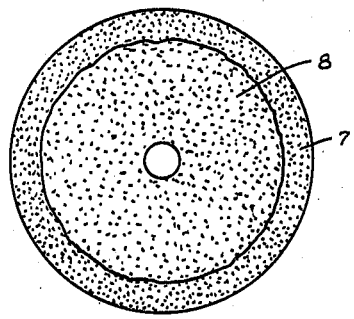
Figure 3 shows a plan view of a peripheral grinding wheel which may be used for grinding or cutting tungsten carbide, glass and other similar materials.

In the peripheral wheel shown in Figure 3, the outer portion 7 containing the cutting agent and the inner or supporting portion 8 can be sintered simultaneously from powdered metal. If diamonds or boron carbide are used as the principal cutting agent, an equivalent quantity of cheaper abrasive or filling material such as glass or quartz is added to the central portion 8 so as to equalize shrinkage, in the same manner as was described in connection with the wheel shown in Figures 1 and 2.

The wheel shown in Figure 3 is especially adapted for the cutting of glass, silicon carbide, quartz and hard refractory materials. Although diamonds give a very high cutting rate when used for these purposes, the differential cost between diamonds and abrasive such as silicon carbide is so great that a metal bonded wheel in which the cutting rate is somewhat less than that of the diamond, but in which the cutting agent is a cheaper abrasive, is often practicable. If the wheel is manufactured from an abrasive such as silicon carbide or fused alumina, a homogeneous mix can of course be used throughout, and separation of the wheel into two portions as indicated in Figure 3 becomes unnecessary.

Figure 4:
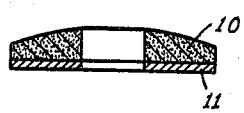
Figure 4 shows a section of a lens grinding disk.

The wheel shown in Figure 4 is of the type which can be used for the grinding of lenses. This wheel preferably consists of an abrasive layer 10 composed of metal bonded diamonds and a sintered metal backing 11, which should also contain an abrasive so as to maintain the same shrinkage as that of the diamond layer. If desired, the wheel can be made with a boron carbide facing and a metal mixture containing silicon carbide or fused alumina as a backing or the wheel can be made entirely from metal bonded silicon carbide or fused alumina.

In making abrasive articles of the type described, the abrasive is mixed with powdered comminuted alloy or with the powdered component metals in the proper proportions, and the mix can then be pressed under a pressure of for example from 10,000 to 50,000 lbs. per square inch. The molded articles can then be sintered in a non-oxidizing atmosphere at a temperature sufficient to produce a coalescence of the metal particles so as to form a strong metallic bond. The temperature required for sintering will of course depend upon the specific alloy used, and when copper alloys are used, the temperature should be from about 50 to 150° below the incipient melting point of the alloy. For example in a sintering copper-tin alloy containing from 5 to 15% tin, temperatures of from 750° C. to 800° C. have been found satisfactory.

As an alternative method to cold pressing, the metal powders which are the components of the desired alloy are mixed and are then mixed with the abrasive grain. The abrasive mix is introduced into a carbon mold and the mold is heated with the simultaneous application of pressure until the final sintering temperature is reached. This latter procedure has been found desirable in the case of alloys of copper and tin, since the tin melts at 232° C. and renders the mix plastic, but thereafter diffuses into the copper to form a solid solution so that the entire mass resolidifies. This incipient melting at a low temperature followed by resolidification to form a homogeneous alloy consisting of a single phase, facilitates diffusion of the metals into each other and gives a stronger more homogeneous bond than when the bonding action depends upon diffusion in the solid state alone.

In the case of metal bonded diamond wheels, and particularly those used for cutting or lapping glass, it is possible to use a relatively soft sintered bond provided there is sufficient abrasive to make the surface of the material wear-resistant. In such cases, the bond is more or less resilient and during grinding or lapping the abrasive acts much as the hard particles in a bearing metal. The wear is taken almost entirely by the hard particles embedded in the resilient matrix and the metal, even though soft, is not worn away. I have found it of advantage to include with the diamonds a certain proportion of other abrasives such as silicon carbide, boron carbide or fused alumina in order to increase the wear-resistant properties of the wheel. This additional abrasive may be somewhat finer in grit size than the diamonds, although with the finer grit diamond wheels this is not always necessary. The additional abrasive when distributed throughout the metal matrix stiffens the metal and makes it very resistant to wear or abrasion. Thus, even in cases when the additional abrasive does no cutting whatever (as when the wheel is used for cutting tungsten carbide, which is practically as hard as the additional abrasive itself), it reduces the wheel loss, which under ordinary conditions is due at least in part to the "undercutting" or wearing away of the metal matrix surrounding the diamonds. The addition of materials such as silicon carbide, boron carbide or fused alumina, quartz or glass to the mix makes possible the use of a fairly low percentage of diamonds to do the cutting, with very little wear of the surrounding matrix. The action of the softer abrasive in making the matrix resistant to wear is of special importance in the cutting of glass, silicon carbide or other hard materials which readily chip and form detritus, since the detritus has an abrasive action upon the metal of the wheel. With additional abrasive interspersed throughout the bond, this wearing action is reduced to a minimum.

Suitable compositions for wheels of the type shown in Figures 1 to 4 are illustrated by the following examples. These compositions have been found satisfactory for the cutting of both brittle materials such as glass and silicon carbide and for the cutting or facing of hard metallic materials such as tungsten carbide.

EXAMPLE I

*Cutting portion*

| | Per cent |
|---|---|
| Diamonds, 100–140 grit | 10 |
| Silicon carbide, 180 grit | 10 |
| Copper | 72 |
| Tin | 8 |

*Supporting metal portion*

| | Per cent |
|---|---|
| Silicon carbide, 180 grit | 20 |
| Copper | 72 |
| Tin | 8 |

Example II

*Cutting portion*

| | Per cent |
|---|---|
| Diamonds, 100–140 grit | 7 |
| Fused alumina, 180 grit | 15 |
| Copper | 71 |
| Tin | 7 |

*Supporting metal portion*

| | Per cent |
|---|---|
| Fused alumina, 180 grit | 22 |
| Copper | 71 |
| Tin | 7 |

Example III

*Cutting portion*

| | Per cent |
|---|---|
| Diamonds | 10 |
| Boron carbide | 10 |
| Copper | 73 |
| Cobalt | 7 |

*Supporting metal portion*

| | Per cent |
|---|---|
| Silicon carbide | 20 |
| Copper | 73 |
| Cobalt | 7 |

Example IV

*Cutting portion*

| | Per cent |
|---|---|
| Diamonds | 5 |
| Boron carbide | 5 |
| Silicon carbide | 10 |
| Copper | 55 |
| Zinc | 25 |

*Supporting metal portion*

| | Per cent |
|---|---|
| Silicon carbide | 20 |
| Copper | 55 |
| Zinc | 25 |

The above examples are merely illustrative, and are not intended to be limiting. For example, the elements retained in solid solution can be added in amounts of a very few per cent up to the maximum limit of solid solubility, depending upon the properties desired. In the case of tin, for example, additions of from 2 to 15 per cent have been found satisfactory. If the ductile properties of the bond are to be retained, the tin content should be less than 20 per cent.

The bonds described can also be used for bonding boron carbide, silicon carbide, fused alumina or mixtures of these abrasives. Boron carbide can, for example, be bonded with a ductile copper base solid solution bond and a softer abrasive such as quartz can be included in the mix to increase the wear resistance of the wheel. Other types of wheels and tools can also be produced, as for example, cup wheels, cut off wheels, laps for edging of lenses, toric lens grinding tools, and other similar articles.

The term "copper base" is a metallurgical term meaning that copper is the predominant metal in the alloy or alloy constituent referred to.

The term "solid solution" is a metallurgical term denoting an alloy or alloy constituent in which the crystals of one metal in separating from the liquid retain, within the crystals, appreciable amounts of some other metal or compound. The crystals of such an alloy or alloy constituent are homogeneous, are not themselves compounds, and cannot be resolved into different constituents under the microscope.

The copper base solid solutions herein described are of the type ordinarily designated in metallurgical practice as "alpha" solid solutions. In such solid solutions the pure metal forms the basis for the lattice structure as determined by X-ray diffraction and the addition of the second metal merely produces a change in the lattice dimensions without producing an undissolved constituent.

The invention can be defined as being within the scope of the following claims:

1. An abrasive article comprising diamonds and a sintered metal bond consisting principally of a ductile copper base solid solution containing between 5 and 15 per cent tin.

2. An abrasive article comprising diamonds and a sintered metal bond in which the principal constituent is the alpha solid solution of copper and tin.

3. A glass grinding lap comprising diamonds and a sintered metal bond, the said bond consisting principally of a ductile copper base solid solution.

JOHN A. BOYER.